United States Patent [19]

McConnell

[11] 4,341,150
[45] Jul. 27, 1982

[54] UNIVERSAL AUTOMOTIVE VENT

[76] Inventors: Alan S. McConnell, 1902 Haverhill Rd., Baltimore, Md. 21234; Thomas R. Bilodeau, 6220 Allender Rd., Baltimore, Md. 21162

[21] Appl. No.: 251,111

[22] Filed: Apr. 6, 1981

[51] Int. Cl.³ .............................................. B60J 1/20
[52] U.S. Cl. .................................... 98/2.12; 296/91
[58] Field of Search .................. 98/2.12, 2, 2.13, 27, 98/44; 296/91; 108/46

[56] References Cited

U.S. PATENT DOCUMENTS

| | | | |
|---|---|---|---|
| 2,062,475 | 12/1936 | Patan | 296/44 |
| 2,164,059 | 6/1939 | Fuller | 98/2.12 |
| 2,236,615 | 4/1941 | Wheeler | 98/2.12 |
| 2,478,161 | 8/1949 | Russell | 296/44 |
| 2,567,799 | 9/1951 | Barnett | 296/84 |
| 2,610,566 | 9/1952 | Schreckengost | 98/2 |
| 2,622,921 | 12/1952 | Zagel | 296/44 |
| 3,726,207 | 4/1973 | Young | 98/2.13 X |
| 4,062,272 | 12/1977 | McCarroll | 98/2.12 |
| 4,191,097 | 3/1980 | Groen | 98/2.12 |
| 4,309,056 | 1/1982 | Long | 98/2.12 X |

Primary Examiner—William E. Tapolcai
Attorney, Agent, or Firm—John F. McClellan, Sr.

[57] ABSTRACT

A vent-wing accessory for either front door of a motor vehicle installs at the front lower corner of a ventless window where it is guidably positionable and is held in place: (a) by fit of a fin downward into the door horizontal glass channel, (b) by fit of an upward axle-extension into the typical door front-frame rearwardly-sloping portion of glass-channel, (c) by forward and upward pressure of inclined portion of a glass window when it is rolled up into contact with a slope of the vent wing accessory, and as a safety, by a line extending from the vent wing accessory and engaging the window roll-up handle in a loop; positive angular positioning of the vent wing accessory is provided in the two-part assembly and alternative embodiments are disclosed.

16 Claims, 4 Drawing Figures

4,341,150

UNIVERSAL AUTOMOTIVE VENT

FIELD OF THE INVENTION

The invention relates generally to automobile accessories and particularly to a wind vent accessory.

BACKGROUND OF THE INVENTION

That the world will not in the foreseable future be able to afford automotive airconditioning on the pre-1973 scale is scarcely open to question. Fuel will be used for other things than artificially cooling motorists, who must revert to reliance on the relative wind of motion for their cooling. Many cars have no windscoop or movable window-vent provisions, and riding in them can be hot and stuffy in the extreme.

In the prior art various devices intended to serve as wind vents have been disclosed, including those in the following U.S. Pat. Nos.:

2,062,475 to C. R. Paton, 12-1-36, disclosed a pivotal vent but with no axle;

2,478,161 to L. E. Russell, 8-2-49, disclosed a snap-on vent;

2,567,799 to B. G. Barnett, 9-11-51, disclosed another form of wing vent mounting;

2,610,566 to H. C. Schreckengost, 9-16-52, disclosed a quick-attach vent wing employing vehicle door channel structure;

2,622,921 to S. J. Zagel, 12-23-52, disclosed a vent wing that could clip onto an automobile vent wing;

4,062,272 to R. A. McCarroll, 12-13-77, disclosed a permanent angle vent wing.

OBJECTS OF THE INVENTION

However, the prior art seems not to supply an angle-adjustable instantly attachable/detachable, positively secured, use either-side vent wing for vent-wingless motor vehicles, and additionally one suited for taking advantage of sloped-back fronts on vehicle front door window-frame and window glass, and to provide such are major objects of this invention.

Further objects are to provide a vent wing as described in embodiment that offers frictional adjustment of angular positioning, doubly safe securance, attractive appearance, durability and low cost. Still further objects are to provide a vent wing as described which fits a wide variety of vehicles and which can be adjusted to blow air into the vehicle or to exhaust air from it.

BRIEF SUMMARY OF THE INVENTION

In brief summary given as cursive description only and not as limitation the invention includes a two-element assembly with downward fin and upward protrusion of wing bearing axle together supporting it in window channel portions of a motor vehicle with rearwardly sloped front frame member of a motor vehicle, where in accordance with proportions provided for the purpose it can be further secured by upward and forward pressure on slight raising of the window glass.

BRIEF DESCRIPTION OF THE DRAWINGS

The above and other objects and advantages of the invention will become more readily understood on examination of the following description, including the drawings in which like characters refer to like reference numerals.

DETAILED DESCRIPTION

Figure 1:
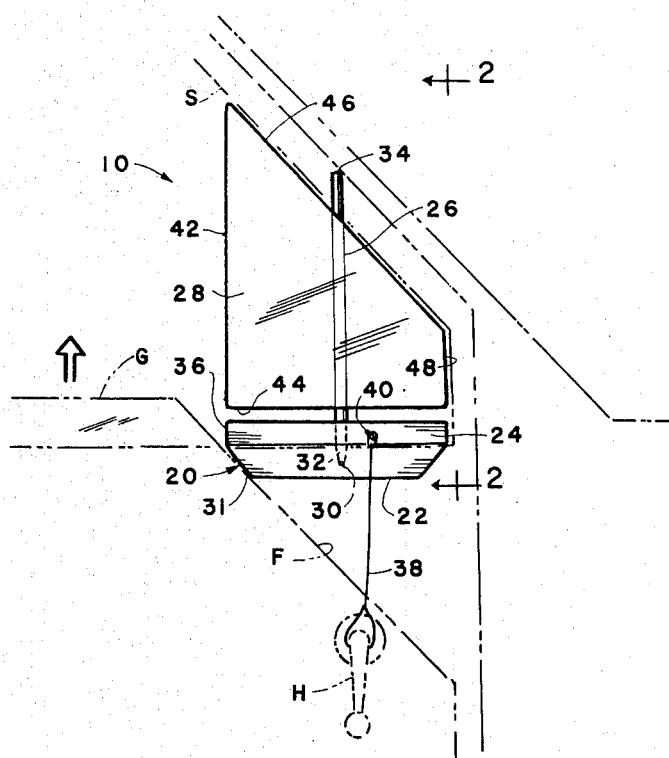
FIG. 1 is a side elevational diagram showing the preferred embodiment installed in a motor vehicle window indicated in phantom lines, on the driver's side of the vehicle.
Figure 2:
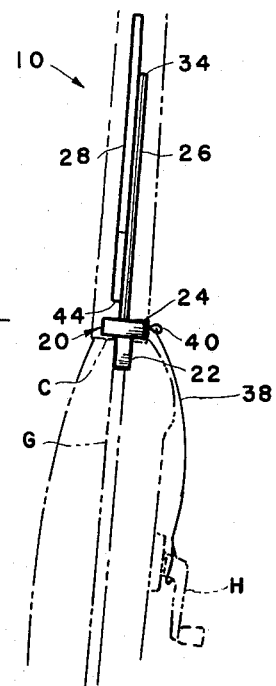
FIG. 2 is a detail adapted from 2—2, FIG. 1, showing the invention on the passenger's side of the vehicle.

FIGS. 1 and 2 show the invention 10 installed in the lower front corner of a front-door window assembly of a motor vehicle where it can be used to control airflow in the manner of a fixed vent when the vehicle window glass G is down.

The invention comprises a two-part assembly 20 of body at the bottom with skeg or fin 22 protruding downwardly from a broader or larger-across stop 24 integral with it, and axle 26, with vane or wing 28 affixed to it by cement or other suitable means, protroducing upwardly from the body and projecting above a portion of the vane or wing.

The axle is pivotally supported upright from the body by a preferably tapered hole 30 in the body, preferably extending into the fin, which receives the preferably tapered lower end 32 of the axle.

The invention 10 secures in the vehicle window in the following ways:

(a) skeg or fin fits snugly in the typically resilient glass channel structure C of the horizontal portion of the window frame, which it is proportioned specifically to do;

(b) the upper end 34 of axle 26 similarly fits snugly into the glass channel structure of the typically sloped-back forward portion of the window frame;

(c) the rearward end 36 of the body 20 is engaged by the typically rearwardly-sloped forward edge F of the window glass and urged upward and forward, producing even tighter retention against the resistance of the contact of the top of the axle, in the back-sloped window frame channel. The skeg or fin may have front and/or back ends 31 diagonally inclined, preferably per the slope of the front edge of the window glass. If both are inclined the skeg or fin is symmetrical about the centerline, facilitating use on either side of the vehicle with either end forward.

(d) elastic cord 38 extending from an eyelet 40 in the body is looped over a window control handle H of the vehicle, as an optional but preferably provision additionally securing the invention 10.

The vane or wing 28 is generally triangular in shape with substantially upright rear edge 42, horizontal bottom edge 44 conforming to the upper edge of the body 20, and rearwardly inclined forward edge 46 for conforming at a slight spacing to the rearward slope S of a vehicle window frame. At 48, the front vertex of the triangular shape is removed for better fit at the corner, some vehicles have this shape at this point and others a sharper vertex; this accommodates to both.

The axle is preferably centered in the length of the body, the stop and fin of which are preferably coextensive with each other. The wing is preferably coextensive in length also.

To install the unit 10 on the other side of the vehicle requires but a moment; the window is lowered, the unit released from the elastic backup or safety line (if used), and shifted to the other side. It does not matter that the axle is on the outside on the other side of the vehicle. Performance is substantially the same with this planar wing structure.

Figure 3:
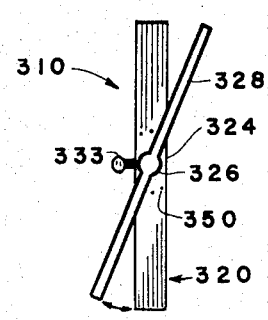
FIG. 3 is a plan view of the invention in a second embodiment.

FIG. 3 shows that in an alternative embodiment 310, the axle 326 and vane or wing 328 can be unitary, as molded in one piece of a suitable transparent plastic, polystyrene being one example of many suitable plastics. Also, shown in this Figure are two detent arcs centered on the axle, one to the front and one to the rear; these are raised nibs 350 on the stop 324 which can engage the lower side of the vane or wing and help retain it in desired position. It is evident that upward cranking of the window can also help to maintain the angular position of the vane or wing by forcing the axle into the socket, and also if nibs are employed by decreasing the clearance of the lower edge of the vane or wing above the nibs.

Threaded through stop 324 is an alternative adjustable friction arrangement in the form of thumbscrew 333 which bears on axle 326.

Figure 4:
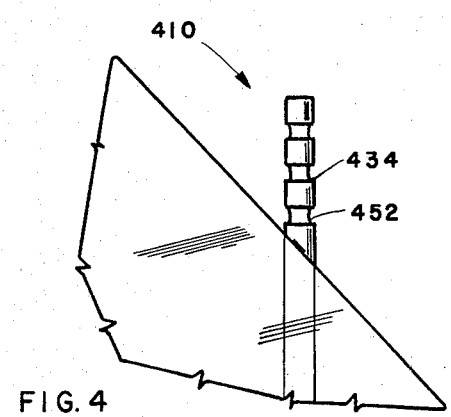
FIG. 4 is a side elevational fragmentary detail of a third embodiment axle provision.

FIG. 4 shows a further embodiment 410 with provision for suiting the length of axle extension relative to the other proportions for fitting in a particular size motor vehicle window. The upper end 434 of the axle has a series of ringshaped reduced sections 452 defining weaker points at which the axle can be snapped-off to produce the needed length for best fit. These may be at ¼ or 178 inch (10 mm or 20 mm) intervals. The user simply sets the unit in place, slides it forward and determines whether the axle length is too long, then repeats the process, taking off one length at a time, until the vent or wing just clears the rearward slope of the vehicle window.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a vent wing for attachment to the lower front corner of a motor vehicle front-door window of the type having no vent wing, and a rearwardly sloping front edge and a horizontal lower edge each with a glass channel therein permitting the door window-glass with matching sloping front edge, to be raised and lowered thereon under control of a window mechanism, the improvement comprising: a body including a fin proportioned for fitting downwardly into a said horizontal glass channel and a stop on a top portion of the fin, an axle supported upright of the body and having an upper end proportioned for fitting upwardly into a said rearwardly sloping front edge glass channel and a wing affixed on said axle below said axle upper portion.

2. In a vent wing as recited in claim 1, the length of said fin being proportioned for retention of said vent wing upon engagement of a lower end portion of said fin by a said door window-glass sloping front edge when said door window-glass is partially raised.

3. In a vent wing as recited in claim 2, said lower end portion of the fin having at least one diagonal edge for conforming to the said sloping front edge of a door window-glass.

4. In a vent wing as recited in claim 2, means permitting the vent wing to be used in either a left or a right front door of a said motor vehicle, including said vent wing being substantially planar.

5. In a vent wing as recited in claim 2, the axle rotatable in said body.

6. In a vent wing as recited in claim 5, and means for adjustably maintaining a selected rotational position of the axle and wing affixed thereto.

7. In a vent wing as recited in claim 6, said means for adjustably maintaining including said body defining a tapered hole in the body, and said axle having a tapered lower end forming a friction fit in said tapered hole.

8. In a vent wing as recited in claim 7, said tapered hole being in the fin.

9. In a vent wing as recited in claim 6, said means for adjustably maintaining including a plurality of nibs on the body in position for being struck by said wing on rotation of said axle.

10. In a system as recited in claim 6, said stop being larger across than the fin and substantially equal in length with the fin.

11. In a system as recited in claim 6, and means permitting the vent wing to be used in either a left or a right front door of said a motor vehicle, including said axle support being centered in the length of the fin.

12. In a system as recited in claim 2, said wing being substantially triangular in shape with a forward edge proportioned for sloping back generally in conformance with a said rearwardly sloping front edge of a motor vehicle front-door window, and a lower front vertex portion of the triangle removed.

13. In a vent wing as recited in claim 12, said affixation of the wing on the axle being with the axle alongside the wing.

14. In a vent wing as recited in claim 12, said affixation of the wing on the axle being with the axle in the plane of the wing.

15. In a vent wing as recited in claim 12, said axle and wing being integral.

16. In a vent wing as recited in claim 4, said lower end portion of the fin having a said diagonal edge at each end thereof.

* * * * *